United States Patent [19]

Stieringer et al.

[11] 4,114,995
[45] Sep. 19, 1978

[54] DIGITAL DISPLAY OF PHOTOGRAPHIC DATA

[75] Inventors: Albert Stieringer, Weil der Stadt; Gerhard Börner, Waldenburg, both of Fed. Rep. of Germany

[73] Assignee: Robert Bosch GmbH, Stuttgart, Fed. Rep. of Germany

[21] Appl. No.: 781,459

[22] Filed: Mar. 25, 1977

[30] Foreign Application Priority Data

Mar. 27, 1976 [DE] Fed. Rep. of Germany ....... 2613154

[51] Int. Cl.² .............................................. G03D 1/60
[52] U.S. Cl. ................................... 352/171; 352/170; 352/172; 354/23 D; 354/60 L; 354/289
[58] Field of Search .................... 352/170, 171, 172; 354/23 D, 60 A, 60 L, 217, 218, 289

[56] References Cited

U.S. PATENT DOCUMENTS

| | | |
|---|---|---|
| 3,971,048 | 7/1976 | Ito et al. ............................... 354/60 L |
| 3,977,776 | 8/1976 | Wagensonner et al. ............. 352/171 |
| 3,982,254 | 9/1976 | Ito et al. ............................... 354/23 D |
| 4,021,828 | 5/1977 | Iura et al. ............................... 354/217 |
| 4,028,712 | 6/1977 | Kawamura et al. ............. 354/23 D |
| 4,032,933 | 6/1977 | Ito et al. ............................... 354/23 D |
| 4,052,126 | 10/1977 | Freudenschuss et al. .......... 352/171 |

FOREIGN PATENT DOCUMENTS 2,521,158  11/1976  Fed. Rep. of Germany ........... 354/217

*Primary Examiner*—Russell E. Adams
*Attorney, Agent, or Firm*—Michael J. Striker

[57] ABSTRACT

A photographic apparatus is comprised of a plurality of adjustable units and a common digital display. The adjustable units and the common digital display are interconnected by information-transmitting circuitry. The circuitry includes selectors for selecting the unit whose setting is to be displayed on the common digital display along with an associated coordination symbol indicating which setting is being displayed.

15 Claims, 12 Drawing Figures

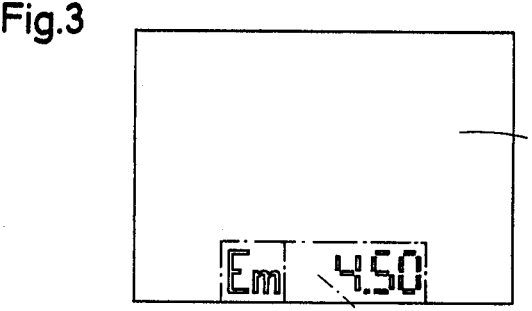
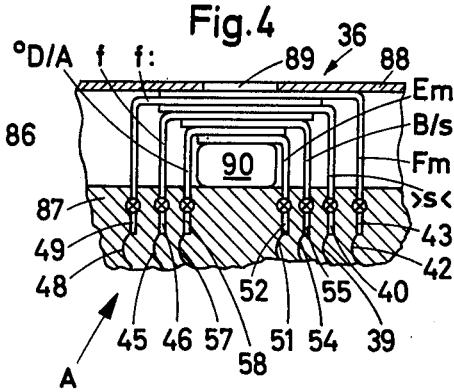
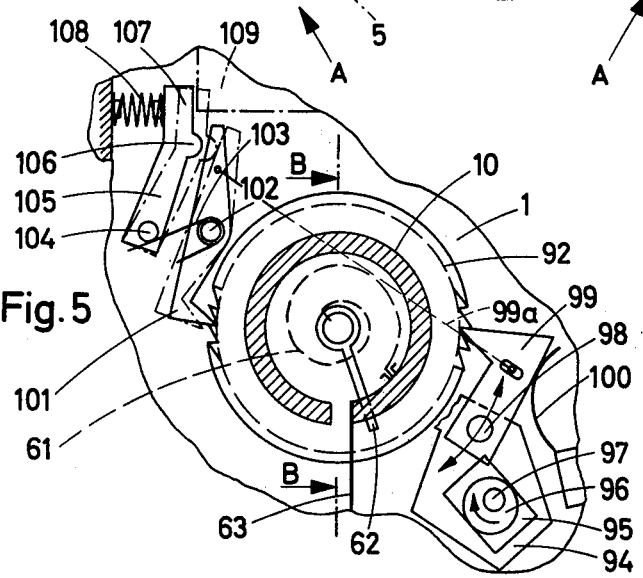
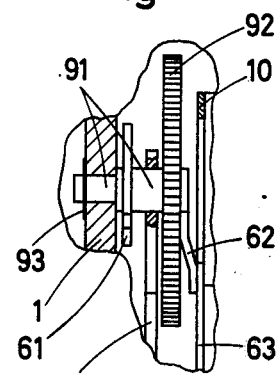
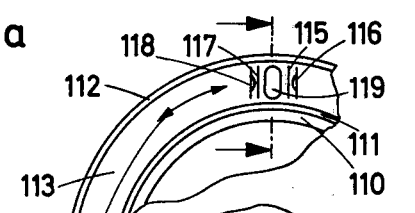
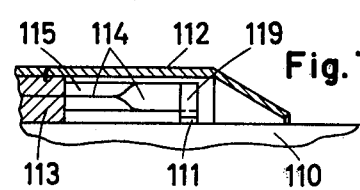
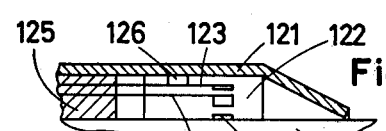
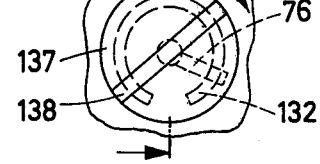

4,114,995

DIGITAL DISPLAY OF PHOTOGRAPHIC DATA

BACKGROUND OF THE INVENTION

The invention relates to an apparatus for effecting digital display of photographic data.

Known arrangements of the type in question are limited to the indication of different exposure values on different respective indicators. Typically, use is made of a plurality of indicators having stationary calibrated scales upon which the instantaneous value of a respective exposure variable is indicated, or else use is made of other types of indicators in which different ones of adjoining illuminatable dots light up to effect indications.

In any event, with this type of indicator system, the user of the apparatus provided with the system must always look from one indicator to the next as soon as a change of the data indicated by one of the indicators has occurred. Most often, the calibrations, or the like, on the different indicators extend in a plurality of directions, for example, both horizontal and vertical; this further complicates the user's task in monitoring the indicators and requires a considerable amount of concentration.

For the rest of the photographic data not contained in the display of the selected exposure values — such as selected subject distance, selected diaphragm setting, selected focal length, selected frame-repetition frequency, remaining length of unexposed film, the film sensitivity for which the apparatus has been set, elapsed scene length in the case of motion-picture film, etc. — there are provided a plurality of associated calibrated scales on the housing of the apparatus. Accordingly, the user is presented with a confusing number of differently designed scales, from which the various values are to be read off. Particularly inasmuch as modern-day photographic apparatuses are in general of ever-decreasing dimensions, the various indicator scales likewise are becoming smaller and smaller, more crowded together, and more difficult to read and interpret. Very often, these indicator scales cooperate with or are located close to the adjusters of the associated functional units of the apparatus or with other adjusters, so that when setting an adjuster, the finger of the user covers over the respective indicator and/or other indicators.

The known indicator systems involve problems besides those of readability. The indicator scales are usually provided on the exterior of the apparatus, for example on rotary adjuster members. This requires a special finish for those parts of the apparatus exterior or the adjuster members provided with the indicator scales. Very often, the aesthetic appearance of the indicator scales contributes, to a disproportionate extent, to a customer's evaluation of the quality of a photographic apparatus that he is considering buying. Accordingly, to take this reality into account, manufacturers produce adjusters and the like of mirror-smooth finish with very cleanly and precisely engraved scales. The production costs involved with such degrees of finish are considerable, and so also are the costs of the assembly of such components.

SUMMARY OF THE INVENTION

It is a general object of the invention to overcome the disadvantages discussed above and provide a central display for most or all of the photographic data to be indicated.

According to the broadest concept of the invention, this is achieved by using a common digital display means interconnected with the adjustable units of the photographic apparatus by information-transmitting circuitry including selector means for selecting which of the adjustable units is to have its setting digitally displayed upon the common digital display means. When the setting of the selected unit is displayed, there is simultaneously displayed upon the common digital display means a coordination symbol associated with the selected functional unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a view through the viewfinder of the camera of FIG. 1;

FIG. 4 is a sectional view of the part of the common digital display means which displays the various coordination symbols;

FIG. 5 is a top view of an intermittent-motion mechanism for an indicator which indicates the length of unexposed film remaining in a camera;

FIG. 6 is a sectional view of the structure shown in FIG. 5, taken along line B—B in FIG. 5;

FIGS. 7a, 7c and 7e depict different switching units; and

FIGS. 7b, 7d and 7f are sectional views through the structures shown in FIGS. 7a, 7c and 7e, respectively.

DESCRIPTION OF THE PREFERRED EMBODIMENT

Figure 1:
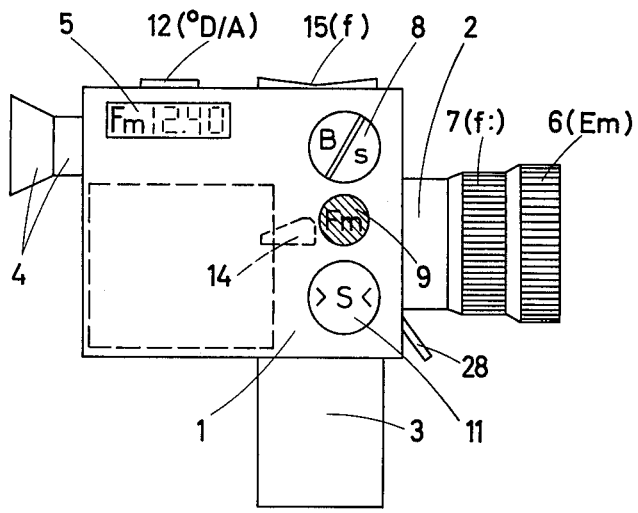
FIG. 1 is a side view of a motion-picture camera provided with the inventive indicator system.

The motion-picture camera 1 includes an objective 2, a handle 3, a viewfinder ocular 4, a number of different externally located adjusters, and a display 5. The adjuster for adjusting the objective 2 for a selected subject distance expressed in meters (Em) is denoted by 6, the adjuster for the diaphragm opening (f:) by 7. The knob 8 serves for the setting of the frame-repetition frequency (B/s) expressed in frames er second, and also serves to trigger the display of the selected frame-repetition frequency. A button 9 is activatable for triggering the display of the length of unexposed film expressed in meters (Fm) remaining; button 9 effects read-out of a storage device 10 (shown in FIG. 2). The button 11 is activated when the display 5 is to be made to present a running display of the length of the scene being filmed. Activation of a button 12 effects read-out of a storage device 13 and display of the film sensitivity value (°D/A) for which the camera has been set. The setting of this storage device 13 is controlled in per se known manner by means of a mark sensor 14 which senses marks on film cassettes or cassette film. A rocker switch 15 serves to control a focal-length adjustment device for the objective 2. The value of the selected focal length (f) is registered by a storage device 16. To effect read-out of storage device 16 and display of its stored information, rocker switch 15 is depressed at both its ends simultaneously. This closes a double-pole switch 17. In response, display 5 produces an illuminated display of the focal length to which the objective has been set and simultaneously a display of the corresponding coordination symbol (*f*). Depression of button 9 closes a double-pole switch 18. This effects display of a number indicating the length of film in meters still available for exposure along with a display of the corresponding coordination symbol (Fm). Depression of switch 12 closes a double-pole switch 19, triggering illuminated display of the numerical value of the film sensitivity to which the camera has been set, along with the associated coordination symbol (°D/A). Knob 8 is turned when it is desired to adjust the frame-repetition frequency. Additionally, it can be depressed, to close a double-pole switch 20. This effects read-out of storage device 21 and illuminated display upon display 5 of the registered numerical value, along with the associated coordination symbol (B/s). The adjuster ring 6 for setting the subject distance (Em) controls a storage device 22 which registers corresponding distance information. When the adjuster ring 6 is to be actually rotated to adjust the objective for distance, the photographer causes the adjuster ring 6 to perform an auxiliary movement (discussed below); this causes adjuster ring 6 to close a double-pole switch 23, as a result of which the display 5 effects an illuminated display of the numerical value of the distance setting and of the associated coordination symbol (Em). The display operation associated with diaphragm-aperture adjuster ring 7 is analogous. The photographer causes the adjuster ring 7 to perform an auxiliary movement (discussed below). This causes adjuster ring 7 to close a double-pole switch 25. As a result, there will be effected an illuminated display of the numerical value of the selected focal length, along with the associated coordination symbol (*f*:) The adjuster ring in this respect cooperates with a storage device 24.

Depression of button 11 closes a double-pole switch 26. Connected in series with the component switches of double-pole switch 26 are the component switches of a double-pole switch 27. The latter is activated by the camera release 28. The camera release 28 additionally closes a release switch 29 to initiate film transport. A pulse generator 30 is controlled, for example, by the edge perforations in a film transported through the camera 1, by the pull-down mechanism of the transport means, by cams connected non-rotatably to a mechanical component of the film transport means, or the like. An IC calculator unit 31 (e.g., a preprogrammed, commercially available microprocessor) processes the frame pulses generated by pulse generator 30, and totalizes these to provide for the display of elapsed scene length. When double-pole switches 26, 27 are closed, the elapsed scene length value and also the associated coordination symbol (>*s*<) are displayed. IC calculator unit 31 is provided with an additional input which can be connected to the output of pulse generator 30 by means of a switch 32. In the single-frame-exposure setting, the release closes the double-pole switch 27 a,d upon closing of the single-frame-exposure switch, closes the switch 32. Switch 32 is closed by means of the release 28 when the latter, in per se conventional manner, is switched over from its normal-filming setting to its single-frame-exposure setting; when release 28 is activated for single-frame exposure, and the (non-illustrated) single-frame-exposure release is depressed, double-pole switch 27 closes as does also switch 32, but transport switch 29 is not closed. To convert the analog values obtained by read-out of the analog storage devices in the indicator circuit of FIG. 2, use is made of an analog-digital converter 33. A decoder 34 decodes all the incoming pulses and conducts them to a display 35, constituting the part of display 5 which displays the numerical value. A display 36 constitutes the part of display 5 which displays the coordination symbols. A current source 37 supplies operating current to the display circuitry.

To implement the aforedescribed display functions, the individual components of the circuit are interconnected as follows. A line 38 is connected from the positive terminal of current source 37 directly to one component switch of double-pole switch 26, via the latter to one component switch of double-pole switch 27, and from there to the connecting terminal 39 for a small lamp 40 in the display 36. Lamp 40 is provided for effecting illuminated display of the coordination symbol for the elapsed scene length indication (>*s*<). From line 38 a line 41 leads to one component switch of double-pole switch 18 and via the latter to the connecting terminals 42 os a small lamp 43, which effects illuminated display of the coordination symbol for the amount of unexposed film remaining (Fm). A line 44 connected to line 38 leads via one component switch of double-pole switch 17 to the connecting terminal 45 of a small lamp 46 for effecting illuminated display of the coordination symbol for the focal length (*f*). Likewise, a line 47 leads from line 38 via one component switch of double-pole switch 25 to the connecting terminal 48 of a small lamp 49 for effecting illuminated display of the coordination symbol for the diaphragm opening (*f*:). A line 50 leads from line 38 via one component switch of double-pole switch 23 to the connecting terminal 51 of a small lamp 52 for effecting illuminated display of the coordination symbol for the subject distance (Em). A line 53 leads from line 38 via a component switch of double-pole switch 20 to the connection terminal 54 of a small lamp 55 for effecting illuminated display of the coordination symbol for the selected frame-repetition frequency (B/s). Finally, a line 56 leads from line 38 via one component switch of double-pole switch 19 to a connection terminal 57 for a small lamp 58 for effecting illuminated display of the coordination symbol for the film sensitivity (°D/A). All the lamps of the display 36 are connected in parallel and connected to ground via a line 59. The connection of of current source 37 to ground is established by a line 60.

A line 61 leads from line 56 to a sliding contact 62 of storage device 10. Sliding contact 62 slides upon a resistor track of storage device 10. Connected to the end of the resistor track is a line 63 which leads to the other component switch of double-pole switch 18 and from the latter to the analog-digital converter 33. A line 64 leads from line 56 to a sliding contact 65 of the storage device 13. Connected to the end of a step-by-step resistor provided on storage device 13 is a line 66; the latter is connected via one component switch of double-pole switch 19 to the line 63. This establishes the requisite connection of the storage device 13 to the analog-digital converter 33.

Figure 2:
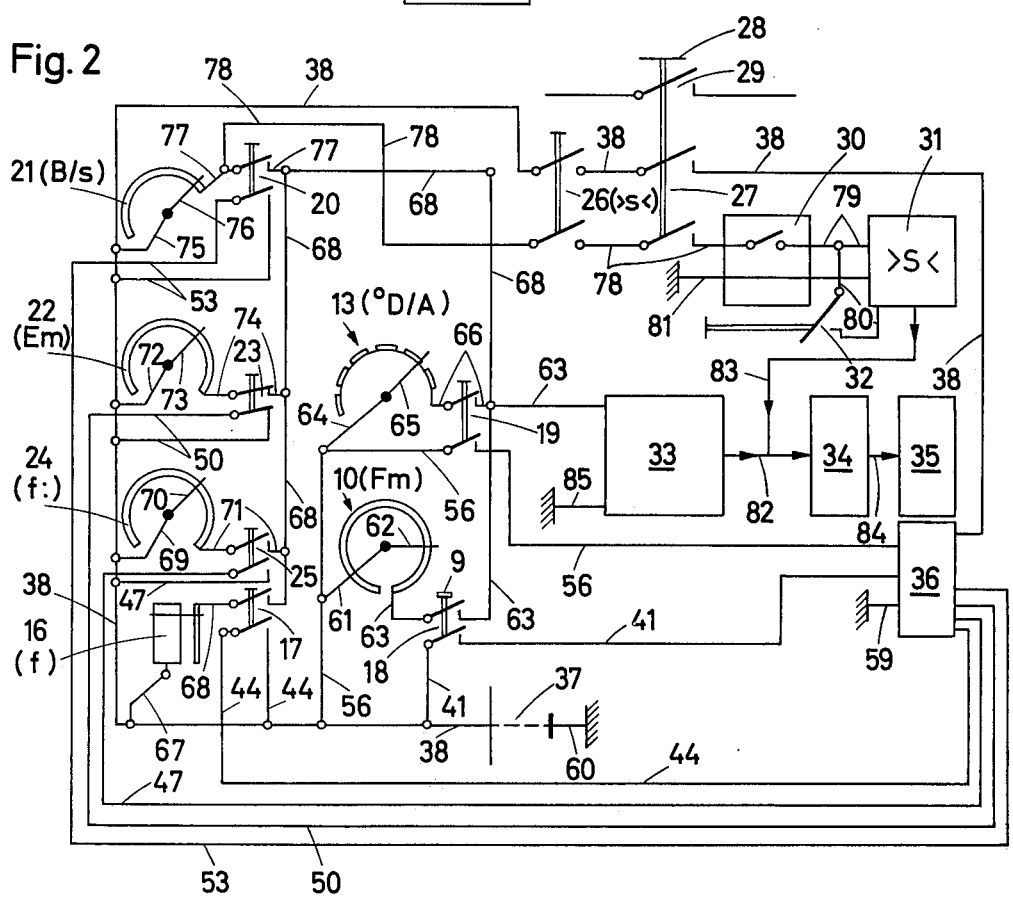
FIG. 2 is a circuit diagram of the indicator system of the camera of FIG. 1.

A line 67 connected to line 38 is connected to storage device 16. A line 68 leads from storage device 16 via one of the component switches of double-pole switch 17 all the way to line 63, and accordingly to analog-digital converter 33. A line 69 connects a sliding contact 70 of storage device 24 to the line 38. The resistor track of storage device 24 engaged by sliding contact 70 is connected to a line 71 which leads via one component switch of double-pole switch 25 to line 68. Accordingly, storage device 24, likewise, is connected to the analog-digital converter 33. The same is true of storage device 22, which is connected to line 38 by a line 72. The sliding contact 73 connected to line 72 slides upon the resistor track of storage device 22; the end of the resistor track is connected by a line 74 via one component switch of double-pole switch 23 to line 68, and accordingly to the analog-digital converter 33. A line 75 connects sliding contact 76 to line 38. The end of the resistor track on which sliding contact 76 slides is connected to a line 77 which leads via one component switch of double-pole switch 20 to line 68, and accordingly to the analog-digital converter 33. Connected to line 77, intermediate the resistor track of device 21 and double-pole switch 20, is a line 78 which leads via one component switch of double-pole switch 26 and one component switch of double-pole switch 27 to the pulse generator 30. Pulse generator 30 is directly connected to IC calculator unit 31 by a line 79 and indirectly via a line 80 connected to line 79 and via switch 32. A line 81 leads from the IC calculator unit 31 and the pulse generator 30 back to ground. The connections from the analog-digital convertor 33 to the decoder 34 and from there to the display 35, as well as those from IC calculator unit 31 to the decoder 34 and to the display 35 are schematically indicated by means of signal flow lines 82, 83 and 84. A line 85 establishes the ground connection for the analog-digital converter 33. As indicated in FIG. 2, each of the parallel-connected storage devices can be individually and independently connected to the display. Likewise, the information corresponding to each coordination symbol can be individually and independently applied to the associated display 36. If inadvertently the storage devices for more than one exposure factor or operating variable are read out simultaneously, and the stored values simultaneously displayed, this is readily apparent in the display itself. The different coordination symbols are so shaped and dimensioned and/or differently positioned relative to one another, that if read-out of more than one storage device is improperly performed, the corresponding coordination symbols will be displayed in superposition or side-by-side, but in any event noticeably, so that the photographer will perceive that the adjoining numerical value does not correspond to a single exposure factor or operating variable.

By connecting the IC calculator unit 31 in series with the storage device 21 for the generation of information indicative of elapsed scene length, the frame-repetition frequency to which the camera has been set is automatically taken into account in the display of elapsed scene length, which is expressed in seconds. Specifically, each pulse generated by pulse generator 30 corresponds to one film frame. The amplitude of the pulses, however, is determined by the setting of sliding contact 76 on the resistor track of storage device 21. Accordingly, the calculator unit 31, which totalizes the pulses from pulse generator 30, produces an output signal directly corresponding to elapsed scene length, not expressed in terms of the number of exposed frames, but instead expressed in seconds. When single-frame exposures are being made (e.g., for special-effects purposes), switch 32 closes, and the pulses from the pulse generator 30 are applied to the auxiliary input of IC calculator unit 31. As a result, there is displayed on display 5, to the right of the decimal point the actual number of single-frame exposures performed, and to the left of the decimal point the length of the resultant scene (constituted by the singly exposed frames) expressed in units of seconds (i.e., corresponding to subsequent reproduction of the scene constituted by the singly exposed frames). When either normal motion-picture filming or a succession of single-frame exposures have been completed, and switch 27 opens, frame pulses are no longer applied by unit 30 to unit 31, and the totalized information in unit 31 becomes automatically erased. The series connection of the double-pole switches 26, 27 makes the elapsed scene length display dependent upon activation of camera release 28. In this way, the elapsed scene length display, with its displayed value changing at least from second to second, simultaneously serves as an indication of film transport.

FIG. 3 shows the arrangement of the display 5 not on the exterior of the camera as in FIG. 1, but within the camera viewfinder 86. The photographer accordingly does not have to move his eyes from the viewfinder when checking the display. The provision of the display 5 within the field of view of the viewfinder will not distract the photographer when he is using the viewfinder per se, because the display will not perform a display operation except when the photographer actually wishes it to and positively activates one of the elements which trigger display.

FIG. 4 depicts details of display 36.

The aforementioned small lamps 40, 43, 46, 49, 52, 55 and 58 with their connection terminals 39, 42, 45, 48, 51, 54 and 57 are cast in place in a holder 87. Light conductors made of acrylic glass are inserted into recesses located above respective ones of the lamps. The several light conductors are denoted by the respective coordination symbols, for convenience. A cover cap 88 is provided with a viewing opening 89 behind which the individual coordination symbols are provided, engraved in the respective acrylic-glass light conductors. The block of acrylic-glass light conductors located behind viewing opening 89 is supported upon the holder 87 by cushion 90 having a matte-black external surface.

FIGS. 5 and 6 depict details of the remaining-film indicator. The latter comprises a ratchet wheel 92 mounted on a pin 91; the sliding contact 62 is connected to wheel 92. Pin 91 is journalled in a bore in the housing of camera 1 and held in place by a retaining ring 93. The electrical connection to the sliding contact 62 is established by means of a spiral spring 61 serving as an electrical conductor; additionally, spring 61 serves as a return spring opposing counterclockwise rotation of ratchet wheel 92. Sliding contact 62 rides upon the resistor track of storage device 62; the resistor track is stationarily mounted on the camera housing and is electrically connected to line 63. A lever 94 is mounted on pin 91. The lever has a cut-out 95 engaged by an eccentric 96 driven by the camera drive mechanism. Eccentric 96, driven by its shaft 97, can cause the lever 94 to swing about the pin 91 of the latter. A pin 98 carried by lever 94 in turn carries a detent 99 biased by a leaf spring 100 connected to a stationary part of the camera housing. Leaf spring 100 is so arranged that it tends to move the detent into engagement with the ratchet wheel. Associated with detent 99 is a pawl 101 which engages the ratchet wheel 92. The pawl 101 is connected with the detent 99 by means of a bar 99a. Pawl 101 is mounted on a pin 102 secured to the camera housing; pin 102 also carries a leg spring 103. Leg spring 103 is so mounted and so braced against an abutment, that it tends to hold pawl 101 in engagement with ratchet wheel 92. Pawl 101 is adjoined by a one-armed lever 105 which is mounted on a pin 104 and has a lobe 106. With its free end 107 it projects through a slit in the housing of camera 1 into the cassette chamber of the camera. A helical spring 108, braced against an abutment on the camera housing, tends to press the one-armed lever 105 into the position just mentioned (shown in dash-dot lines in FIG. 5). The force of helical spring 108 is so dimensioned that it can, in cooperation with one-armed lever 105 and bar 99 a, lift the pawl 101 and the dentent 99 out of engagement with the teeth of ratchet wheel 92 against the opposition of leg spring 103 and leaf spring 100, lever 105 engaging pawl 101 with its lobe 106. As soon as a film cassette 109 is inserted into the cassette chamber of camera 1, the one-armed lever 105 is forced out of the cassette chamber. Pawl 101, urged by its leg spring 103 which is braced against a pin 104 on the lever 105 and detent 99, urged by its leaf spring 100, can engage the teeth of ratchet wheel 92. When the camera drive mechanism is in operation, the eccentric 96 drives the lever 94 and causes the latter to pivot back and forth about pin 91, so that the ratchet wheel is stepped tooth-by-tooth in counterclockwise direction. The sliding contact 62 assumes corresponding positions upon the resistor track of storage device 10. The potential on sliding contact 62 accordingly constitutes stored information indicative of the amount of film remaining for exposure, and this information can be read out when desired. When film exposure has been completed, the film cassette is removed from the camera. The one-armed lever 105 pivots under the action of helical spring 108 into the cassette chamber and lifts the tooth of pawl 101 and detent 99 out of engagement with the teeth of ratchet wheel 92. The electrically conductive spiral spring 61 moves the ratchet wheel 92 in per se known manner back to its starting position. The storage of information indicative of film supply is thereby erased.

FIGS. 7a and 7b depict an objective tube 110 provided with a contact track 111. Objective tube 110 carries and adjuster ring 112 through the intermediary of an intermediate ring 113 fixedly connected to the adjuster ring 112. Mounted in the intermediate ring 113 are spring contacts 114–118. The spring contacts 114–116 together and the contacts 114, 117, 118 together form two double-pole switches, such as double-pole switch 23. Spring contact 114 is twisted, so that its contact head 119 resiliently lies upon the contact track 111, but so that additionally it can bend either to the spring contact 115 or to the spring contact 117. If adjuster ring 112 is turned in the direction indicated by arrow 120, the contact head 119 of spring contact 114 is initially held in place due to frictional engagement with contact track 111. Spring contact 114 springs out into engagement with spring contact 115 or else spring contact 117, thereby closing the double-pole switch which effects read-out of the storage device associated with this adjustment, e.g., storage device 22. Initially, the spring force of all the contacts (whose bending motion could be limited by a stop) attemts to overcome the frictional engagement between contact head 119 and contact track 111. Accordingly the point of engagement of contact head 119 upon contact track 111 — e.g., corresponding to the sensing position of sliding contact 73 upon the resistor track of storage device 22 — changes. In this way, the triggering motion which triggers display of the setting established by the adjuster ring, can be constituted by or associated with the initial portion of every motion of the adjuster ring.

FIGS. 7c and 7d likewise depict an objective tube 110 with a similar contact track 111. Instead of the adjuster ring 112, use is made of an adjuster ring 121 provided with a cut-out 122. Blade contacts 123 and 124 are secured in an intermediate ring 125 coupled to the adjuster ring. A sliding member 126 on the blade contact 123 senses the concave inner surface 127 of the cut-out 122. When the adjuster ring 121 is turned in the direction of arrow 128, the concave inner surface 127 forces the blade contacts 123 and 124 into the switch-on position and into engagement with contact track 111. The lateral boundary surfaces 129 of the cut-out 122 limit the auxiliary movement by means of which the adjuster triggers display of the selected value. If the adjuster ring 121 is turned by an amount in excess of that corresponding to this auxiliary movement, the intermediate ring 125 begins to be carried along in unison so that further movement of the adjuster ring begins to actually change the selected value.

FIGS. 7e and 7f, finally, depict an embodiment of an adjuster designed to act both as a rotary know for effecting adjustments of exposure values or camera operating variables and also as a pushbutton for effecting read-out and numerical display of the value selected by the adjuster.

A rotary body 130 extends through aligned bores in three successive stationary walls. Two of these walls are constituted by portions of the housing of the camera 1, whereas the middle wall 131 is constituted by an inserted-in isolation plate. The isolation plate 131 carries a resistor track 132. A sliding contact 76 provided on the rotary body 130 is so positioned relative to the resistor track as to be able to slide along it. A helical spring 133 is pushed onto the rotary body 130 intermediate the inner housing wall 1 and the isolating plate 131. Helical spring 133 is braced against the housing wall and against a retaining disk 134 which engages a peripheral recess 135 in the rotary body 130. The free inner end of the rotary body 130 bears against blade contacts of a switch 136. The portion of rotary body 130 located exteriorly of the camera housing has the form of a disk 137 and a central knob 138. When the central knob portion 138 of rotary body 130 is gripped by the photographer and turned, conventional (non-illustrated) adjusting means of suitable type effect a corresponding adjustment of the setting of the associated adjustable mechanism in the camera. To effect read-out and numerical display of the value selected by the adjuster, the rotary body 130 is depressed by the photographer in the direction of arrow 139. This closes switch 136 and presses the sliding contact 76 into engagement with the resistor track 132. As a result, both the numerical value of the adjusted variable and also the associated coordination symbol are displayed.

It will be understood that each of the elements described above, or two or more together, may also find a useful application in other types of constructions differing from the types described above.

While the invention has been illustrated and described as embodied in a digital display of photographic data, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic apparatus of the type comprised of a plurality of adjustable units, in combination, a common digital display means; and information-transmitting means interconnecting the adjustable units and the common display means and operative for causing the common display means to effect a display of the setting of any selected one of the adjustable units, including selector means operative for selecting the unit whose setting is to be displayed on the common display means, the selector means comprising a plurality of display-select switch means each associated with a respective one of the adjustable units and operative when activated by the user for connecting to the common digital display means a respective one of the plurality of adjustable units.

2. In a photographic apparatus as defined in claim 1, the information-transmitting means comprising a plurality of storage means each associated with a respective adjustable unit and operative for storing information representing the setting of the respective unit and means for causing the common display means to effect a display of the information stored by any selected one of the storage means, the selector means comprising means operative for selecting the storage means whose stored information is to be displayed on the common display means.

3. In a photographic apparatus as defined in claim 2, at least some of said storage means being analog storage means operative for storing said information in analog form, the information-transmitting means further including analog-to-digital converter means operative for converting the information stored in analog form into digital form for display on the common digital display means.

4. In a photographic apparatus as defined in claim 3, the common digital display means having a predetermined number of display places for digital display of the setting of the selected adjustable unit, the analog storage means each being operative for transmitting to the analog-to-digital converter means a respective analog signal whose value varies within a predetermined range corresponding to the range of settings of the associated adjustable unit, each predetermined range being so preselected that upon conversion of the respective analog signal to digital form and display of the corresponding digital information upon the common digital display means all of said predetermined number of display places are utilized.

5. In a photographic apparatus as defined in claim 1, the common digital display means including means for digitally displaying the setting of any selected one of the adjustable units and means for displaying different coordination symbols associated with respective ones of the adjustable units, the information-transmitting means including means for causing the common display means to effect simultaneous display of both the setting of any selected one of the adjustable units and the associated coordination symbol.

6. In a photographic apparatus as defined in claim 3, at least one of said storage means being a digital storage means operative for storing said information in digital form, the information-transmitting means including decoding means connected directly between the digital storage means and the common display means and operative for decoding the digital information and effecting a corresponding display on the common digital display means.

7. In a photographic apparatus as defined in claim 1, at least some of the adjustable units being provided with manually movable adjusters, each of said manually movable adjusters being movable by the user to adjust the numerical value to which the associated one of the adjustable units is set, the selector means comprising means for automatically selecting which one of the adjustable units provided with the manually movable adjusters is actually to have its setting displayed by activating the display-select switch means associated with the unit whose setting is to be displayed in automatic response to the user performing a predetermined movement of one of the manually movable adjusters, whereby when the user touches one of the manually movable adjusters and moves it this automatically causes the adjustable unit associated with the moved adjuster to have its current setting displayed on the common digital display means.

8. In a photographic apparatus as defined in claim 7, at least some of the manually movable adjusters being capable of performing an adjusting motion changing the setting of the respective unit but not constituting said predetermined movement and also an auxiliary movement controlling an auxiliary operation not changing the setting of the respective unit, the auxiliary movement constituting said predetermined movement, whereby when the user touches one of these manually movable adjusters and performs the auxiliary movement this automatically causes the adjustable unit associated with the thusly moved adjuster to have its current setting displayed on the common digital display means.

9. In a photographic apparatus as defined in claim 7, at least some of the manually movable adjusters being capable of performing an adjusting motion changing the setting of the respective unit but not constituting said predetermined movement and also an auxiliary motion not changing the setting of the respective unit, the auxiliary motion constituting said predetermined movement, whereby when the user touches one of these manually movable adjusters and performs the auxiliary motion this automatically causes the adjustable unit associated with the thusly moved adjuster to have its current setting displayed on the common digital display means.

10. In a photographic apparatus as defined in claim 7, said predetermined movement of said manually movable adjusters being a movement changing the numerical value to which the associated one of the adjustable units is set, whereby when the user touches one of the manually movable adjusters and changes the setting of the associated one of the adjustable units this automatically causes the one adjustable unit whose setting is being changed to now have its setting displayed on the common digital display means.

11. In a photographic apparatus as defined in claim 1, the apparatus being a motion-picture apparatus, one of the adjustable units being operative for generating information indicative of the length of film remaining in the film supply unit of the apparatus, the information-transmitting means comprising means receiving the film-length information and effecting digital display thereof upon the common digital display means in units of meters.

12. In a photographic apparatus as defined in claim 1, the photographic apparatus having a housing, the common digital display means being located on the exterior of the housing.

13. In a photographic apparatus as defined in claim 1, the photographic apparatus including a viewfinder, the common digital display means being located viewable through the viewfinder.

14. In a photographic apparatus as defined in claim 5, the means for displaying different coordination symbols comprising a plurality of superimposed illuminatable elements each bearing a respective coordination symbol, the configuration and disposition of the coordination of the sumbols on the superimposed illuminatable elements being such that in the event of improper simultaneous selection of a plurality of adjustable units the fact that a plurality of associated coordination symbols are being displayed will be perceivable.

15. In a photographic apparatus as defined in claim 1, the apparatus including at least three adjustable units, the selector means accordingly comprising at least three display-select switch means, each associated with a respective one of the at least three adjustable units and each operative when activated by the user for connecting to the common digital display means the respective one of the at least three adjustable units.

* * * * *